United States Patent [19]
Ettischer

[11] 3,893,137
[45] July 1, 1975

[54] DUAL LENS CAMERA FOCUS MEANS

[76] Inventor: Helmut Ettischer, 60 Wangen, Posthach 369, 7 Stuttgart, Germany

[22] Filed: June 10, 1974

[21] Appl. No.: 477,580

[30] Foreign Application Priority Data
June 14, 1973 Germany.......................... 2302650

[52] U.S. Cl. .............................................. 354/197
[51] Int. Cl. ............................................. G03b 3/00
[58] Field of Search............................ 354/195, 197

[56] References Cited
UNITED STATES PATENTS
3,185,061   5/1965   Westphalen ....................... 354/197

*Primary Examiner*—John M. Horan
*Attorney, Agent, or Firm*—R. F. Brothers

[57] ABSTRACT

A camera includes a focusable primary lens, a selectively usable converter lens for changing the camera's effective focal length and a movable focus member. The focus member is usable only when the converter lens is aligned with the camera's optical axis; at other times the focus member is covered to be inaccessible. The primary lens has a predetermined optimum fixed-focus setting when used alone, and means are provided for automatically adjusting the primary lens to that optimum focus setting when the converter lens is moved out of alignment with the optical axis.

2 Claims, 2 Drawing Figures

DUAL LENS CAMERA FOCUS MEANS

BACKGROUND OF THE INVENTION

1. Field of the Invention

The present invention relates to cameras having a focusable primary lens and a converter lens selectively movable into the optical axis to change the focal length of the optical system, and more particularly to a mechanism for permitting focus adjustment when the converter lens is in place and for illiminating the necessity for such adjustment when the converter lens is not used.

2. Description of the Prior Art

It is known to provide cameras with a primary lens of a predetermined focal length and with a converter lens movable into the optical axis of the camera to change (increase or decrease) the effective focal length of the optical system. Such cameras can be fixed-focus or variable focus, and, if the latter, can be adjusted by axial movement of the primary lens. For instance, German published Application No. 1,095,514 discloses a motion picture camera having a focusable primary lens and a set of converter lenses movable into and out of the camera's optical axis. At one setting of the camera, the primary lens is the sole lens in the optical axis, all converter lenses being removed therefrom. Regardless of the setting, the primary lens is focusable and must be adjusted to provide optimum results.

In such systems, when a single focus adjustment mechanism, such as a focus scale or rangefinder, is used for the camera, complications may arise from the fact that the lens focusing mechanism must be designed to compensate for the different focal lengths, since the distance that the primary lens must be moved in focusing is determined by the focal length of the lens group used. For instance, if the converter lens increases the magnification of the optical system, greater movement is required of the primary lens to change the focal length by a given amount that when the converter lens is out of the system. Accordingly, in cameras wherein the primary lens is focusable regardless of whether the converter lens is in the system or not, some provision must be made for changing the mechanical gain between the manually movable focus member and the primary lens.

SUMMARY OF THE INVENTION

It is well known that short focal length lenses have a longer depth of field than long focal length lenses. That is, proper focus is less critical with a short focal length lens than with a long focal length lens. Therefore, cameras that provide for setting the focus for all lenses, regardless of focal length, have been found to be more complicated in operation and more expensive than necessary for the average amateur photographer. Accordingly, it is an object of the present invention to provide a camera of the type having a primary lens and at least one converter lens with a mechanism which will permit focus adjustment of the primary lens when the converter lens is used to increase the camera's focal length, and which mechanism illiminates the need to focus the camera when the primary lens is used alone. This permits accurate focusing of the longer focal length lens combination, such accurate focusing being more critical, while illiminating the need for focusing the short focal length lens, which will produce acceptable results without adjustment.

In keeping with the above object, the illustrated embodiment of a camera according to the present invention includes a primary lens having a predetermined optimum fixed-focus position and a converter lens selectively movable into axial alignment with the primary lens to increase the camera's focal length. The primary lens is focusable, but when the converter lens is out of alignment therewith, the focus member is covered so as not to be accessible to the operator. At the same time, means associated with the focal member and the converter lens move the focus member to a position corresponding to the optimum fixed-focus setting of the primary lens when the converter lens is moved out of alignment with the primary lens.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENT

Because cameras are well known, the present description will be directed in particular to elements forming part of, or cooperating more directly with, apparatus in accordance with the present invention. It is to be understood that camera elements not specifically shown or described may take various forms well known to those skilled in the art.

Figure 1:
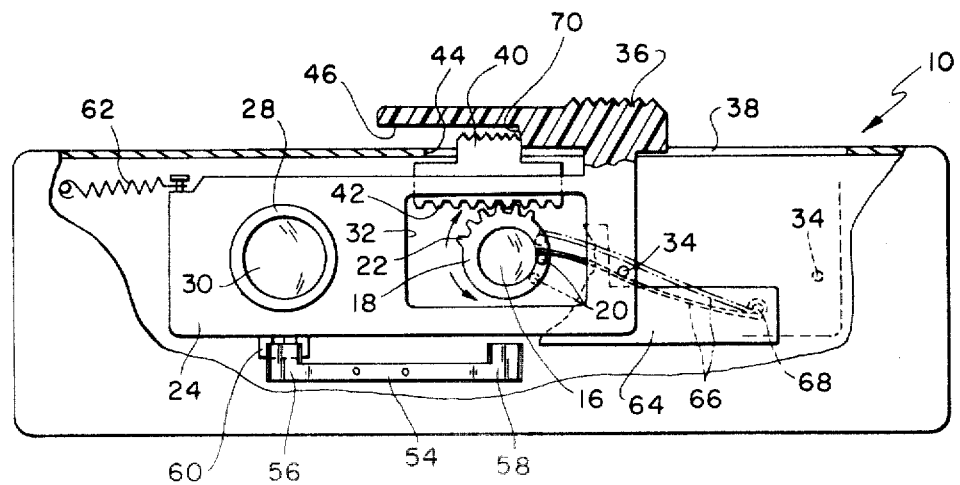
FIG. 1 is a front view partially in section of a portion of the camera in accordance with the present invention.
Figure 2:
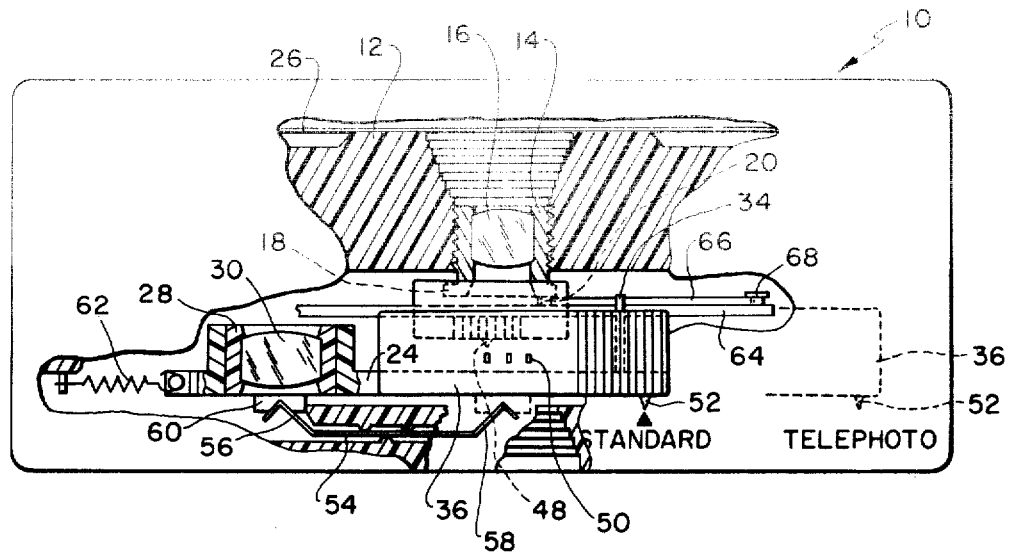
FIG. 2 is a top view partially in section of the camera shown in FIG. 1.

Referring to FIGS. 1 and 2, a camera 10 includes a fixed lens carrier 12 which bears a threaded mount 14 with a primary lens 16. Toward the direction of the front of camera 10, threaded mount 14 has a collar 18 at the end of which there is a pin 20. On its periphery, collar 18 has a toothed segment 22 pointing generally towards the top of the camera.

In front of the fixed lens carrier 12, a second lens carrier 24 is mounted in guides, not illustrated, to be slidable in a direction parallel to film plane 26. As can be seen from FIG. 1, lens carrier 24 is rectangular and bears a mount 28 for a lens 30. Of course lenses 16 and 30 may be formed of a plurality of elements, and lens 30 is such as to increase the effective focal length of the camera's optics when moved into alignment with lens 16 in a manner explained hereinafter.

On a level with the height of the optical axis of the image gate, lens mount 24 has a light admittance opening 32 and a pin 34 which points towards lens carrier 12. Lens carrier 24 has an integral actuating handle 36 which is L-shaped, its short leg projecting through a slot 38 in the top of camera 10.

Above toothed segment 22 of threaded mount 14 is a focusing slider 40 whose lower half has a plurality of teeth 42 which are operationally connected with toothed segment 22. The manipulating portion of slider 40 also projects through a slot 44 in the top of the camera and further into a recess 46 in the long leg of actuating handle 36. The manipulating portion of focusing slider 36 has an indicating nose 48 which points to a distance scale and/or symbols 50 on the top of the camera. The top of the camera also bears the words "standard" and "telephoto," towards which there points an indicating nose 52 of actuating handle 36.

Below lens carrier 24 is an engagement spring 54 having two V-shaped engagement tongues 56 and 58 which, as will be described in more detail later on, can snap into an engagement point 60 which projects from the underside of the lens carrier. Lens carrier 24 is furthermore under the influence of a tension spring 62.

Between the two lens carriers 12 and 24 is a shutter plate 64 which supports a shutter and a diaphragm, not illustrated. This diaphragm may be either fixed or variable. A leg spring 66 is mounted on a pin 68 on shutter plate 64 and its leg extends in the direction of threaded mount 14 swings freely and projects with its free end into the range of movement of pin 20 which is situated on the end of threaded mount 14.

OPERATION

In the normal focal length setting, primary lens 16 alone is in the camera's optical axis in a fixed-focus setting. Telephoto lens 30 is outside the image field raypath, lens carrier 24 being held in the position shown in FIGS. 1 and 2 by means of engagement tongue 56 of spring 54. Actuating handle 36, integral with the lens carrier, covers focusing slider 40 and distance scale and/or symbols 50 associated therewith, and the indicating nose 52 points to the word standard. It is also possible just to provide lens carrier 24 with a small displacement lug and means for covering focusing slider 40 and the distance scale and/or symbols 50. Such means might for instance be a cover rod which could be slid along in the top of the camera.

In order to change the focal length of the camera, lens carrier 24 is slid by means of actuating handle 36 contrary to the force of spring 62 and, the spring force of the first engagement tongue 56 on engagement point 60 on the lens carrier being overcome, moved to the right until indicating nose 52 points to the word telephoto and the second engagement tongue 58 drops into engagement point 60 on the lens carrier. At the same time second engagement tongue 58 aligns lens carrier 24 parallel to the film plane 26. Telephoto lens 30 with the long focal length now lies in exact alignment in front of primary lens 16. Together, the two form a telephoto system and primary lens 16 can be adjusted in the range of the distance scale and/or symbols 50, which were revealed during the displacement operation, by means of focusing slider 40. By the setting of the index marker 48 to a number on distance scale and/or distance symbol 50, and the movement of the focusing slider 40 connected therewith, toothing 42 of the slider cooperates with the toothed segment 22 of threaded mount 14 of primary lens 16, causing the mount to be rotated a little into or out of lens carrier 12 for the purpose of focusing.

On displacement of lens carrier 24 from standard to telephoto, pin 20 is also disengaged from the leg of spring 66 so that the latter swings into the position shown in dash-dotted lines in FIG. 1.

If the position standard is once more required after telephoto tension spring 62 brings lens carrier 24 and the focusing arrangement into their positions as shown in FIGS. 1 and 2, overcoming the force of engagement spring 58. If the index marker 48 of focusing slider 40 had previously been set to a distance value and/or symbol to the right of the scale when primary lens 16 was being focused in the telephoto position (this would mean rotating threaded mount 18 in a clockwise direction) edge 70 of handle 36 engages the end of focusing slider 40 and takes it along when lens carrier 24 is being moved to the left. Threaded mount 14 is brought counterclockwise to its initial position which corresponds to the fixed-focus position via the toothing 42 and 22.

When primary lens 16 is focused in the telephoto position, the index marker 48 can also be set to a distance value and/or symbol 50 to the left. If this is so, threaded mount 14 is rotated in a counterclockwise direction. When lens carrier 24 is moved back, pin 34 on the lens carrier acts upon the leg of spring 66 (which is in the position shown in dash-dotted lines). The free end of the spring is placed against pin 20 of threaded mount 14 and moves the mount clockwise into the initial position which corresponds to the fixed-focus position.

Owing to the cooperation of the edge 70 with the end of focusing slider 40 when the primary lens mount is rotated clockwise, and owing to the transmission of the controlled movement of the spring 66 to the primary lens mount when the latter is in its counterclockwise position, the automatic transfer of the primary lens into the fixed-focus position is always brought about when the camera is adjusted from telephoto to standard.

The invention has been described in detail with particular reference to a preferred embodiment thereof, but it will be understood that variations and modifications can be effected within the spirit and scope of the invention.

I claim:

1. In a camera having a focusable primary lens, a converter lens movable into and out of axial alignment with said primary lens to change the camera's focal length and a movable focus member for focusing said primary lens; the improvement comprising means movable with said converter lens for covering said focus member when said converter lens is out of alignment with said primary lens, said covering means being moved to a position uncovering said focus member when said converter lens is moved into alignment with said primary lens.

2. The improvement as defined in claim 1 wherein said primary lens has a predetermined optimum fixed-focus setting when said converter lens is out of alignment therewith, said improvement further comprising means associated with said focus member and said converter lens for moving said focus member to a position corresponding to said optimum fixed-focus setting when said converter lens is moved out of alignment with said primary lens.

* * * * *

UNITED STATES PATENT OFFICE
CERTIFICATE OF CORRECTION

PATENT NO. : 3,893,137
DATED : July 1, 1975
INVENTOR(S) : Helmut Ettischer

It is certified that error appears in the above-identified patent and that said Letters Patent are hereby corrected as shown below:

Title Page, below lines identifying Inventor, please insert
--Assignee: Eastman Kodak Company, Rochester, N.Y.--

Column 1, line 11   change "illiminating" to --eliminating--

Column 1, line 63   change "illiminates" to --eliminates--

Column 1, line 67   change "illiminating" to --eliminating--

Signed and Sealed this twenty-seventh Day of January 1976

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

PATENT NO. : 3,893,137
DATED : July 1, 1975
INVENTOR(S) : Helmut Ettischer

It is certified that error appears in the above—identified patent and that said Letters Patent are hereby corrected as shown below:

Delete "June 14, 1973 Germany 2302650" on Title Page and substitute therefor --2330265.0 Germany June 14, 1973--

Signed and Sealed this sixteenth Day of March 1976

[SEAL]

Attest:

RUTH C. MASON
*Attesting Officer*

C. MARSHALL DANN
*Commissioner of Patents and Trademarks*